Patented June 15, 1948

UNITED STATES PATENT OFFICE 2,443,285

CATALYTIC REFORMING OF HYDROCARBONS

Glenn M. Webb and Marvin A. Smith, Chicago, Ill., assignors to Universal Oil Products Company, Chicago, Ill., a corporation of Delaware No Drawing. Application January 18, 1943, Serial No. 472,754

4 Claims. (Cl. 196—50)

This invention is concerned with the manufacture of catalysts useful in various processes involving the treatment or conversion of organic compounds and particularly in processes involving conversion reactions of hydrocarbons. It is more particularly concerned with improved methods for the manufacture of catalysts having superior activity in these types of processes.

The process broadly comprises precipitating hydrated alumina from a solution of an aluminum salt, using an alkaline precipitant capable of forming a volatilizable salt with the acid radical of said aluminum salt, washing the hydrated alumina without substantially drying it, suspending the hydrated alumina in a solution of a compound of a substance capable of yielding a catalytic composite with alumina, and heating the mixture to remove volatile material and to develop the desired catalyst.

In one specific embodiment the present invention comprises a process for the manufacture of catalysts consisting of aluminum oxide and other catalytically active substances which consists in adding a volatile basic precipitant to a solution of an aluminum salt under conditions of temperature, concentration of reactants and rate of addition of precipitants which will form a gelatinous precipitate of hydrated alumina, separating and washing said alumina without otherwise substantially drying it, to the substantially complete removal of soluble salts therefrom, suspending the washed alumina in water, adding a compound capable of yielding said catalytically active substance to the suspension, heating the suspension to evaporate water and calcining to develop the desired catalyst.

The process of the invention is particularly applicable to the production of catalysts in which alumina is a major constituent and oxides such as molybdic oxide are relatively minor constituents such as catalysts are particularly useful in various hydrocarbon conversion reactions including hydrocarbon hydrogenation reactions in which hydrogen is simply added to saturate unsaturated hydrocarbons; or in the so-called destructive hydrogenation processes in which decomposition and recomposition reactions occur in the presence of hydrogen; dehydrogenation of organic compounds such as hydrocarbons; reforming of gasolines to improve anti-knock properties, etc. Alumina-molybdena catalysts are particularly useful in the so-called "hydroforming" processes in which gasolines inferior in anti-knock value are heated in contact with catalysts in the presence of hydrogen to increase their anti-knock properties by reactions which may involve cracking, cyclization and isomerization, the hydrogen influencing the reactions in the direction of increased anti-knock value without material consumption thereof and in general lowering carbon deposits on the catalysts.

Other catalysts which may be made by the process of the present invention include those comprising alumina and the oxides of chromium and/or tungsten, which metals are listed in the left-hand column of the VIth group of the periodic table along with molybdenum; or catalysts comprising alumina plus metals or oxides of metals of the iron group including iron, nickel and cobalt. Other catalysts which may be made in accordance with the process of the present invention include those consistsing of alumina and the oxides of the elements in the left-hand column of group IV comprising cerium, thorium, zirconium and titanium; and the left-hand column of group V comprising vanadium, columbium and tantalum. These various catalysts may be used in different hydrocarbon conversions such as cracking, hydrogenation, reforming, dehydrogenation, dehydrocyclization, and isomerization of paraffin and naphthene hydrocarbons.

The preparation of catalysts by the present invention involves in the first step precipitation of a hydrated alumina from a solution of an aluminum salt using volatile basic precipitants such as ammonium hydroxide or ammonium carbonate. Alternatively, amines and alkyl-substituted ammonium bases may be used as precipitants. The precipitant should form a salt with the acid radical of the aluminum salt, which is volatilizable, or decomposable into volatile materials at the conditions of final calcination of the composite. The conditions under which precipitation is brought about are preferably controlled so that a gelatinous, filterable precipitate is formed which consists principally of gamma alumina monohydrate. The concentration of the aluminum salt may vary over a considerable range but is usually within the range of 1 gram molecular equivalent of aluminum chloride hexahydrate in from about 1 to 5 liters of water. Concentrated solutions of precipitant such as ammonium compounds, may be used in the precipitation which may be conducted at temperatures of from about 0 to about 90° C., and precipitation is preferably conducted during vigorous stirring so that the precipitate is obtained in a relatively finely divided condition. The precipitant is added until a pH value of from about 5 to about 8.5 is produced and at this time the precipitate is separated and washed to remove a substantial portion of soluble salts. Alternatively, with the precipitation of the hydrated alumina as a finely divided gelatinous hydrated material, a sol may be produced which is allowed to gel and the gel broken up for the washing step. Various aluminum salts may be used in the solutions to which the precipitants are added, such as the chloride, bromide, iodide, sulfates, carbonate, and salts of organic acids such as acetic and oxalic acids. The aluminum salt is preferably a salt of a volatile acid. While aqueous solutions are generally satisfactory, other solvents such as alcohols may be used.

In the next step the precipitated wet hydrated alumina is filtered and washed by any suitable method such as by decantation, percolation or alternate slurrying and filtering. Washing is preferably conducted with water having a pH close to 7 to prevent increase in size of the alumina particles which may occur if water having a pH higher than this is employed. If pH values lower than 7 are employed, there will be a tendency of re-solution of the alumina. Washing may be conducted until substantially all of the ammonium salts are removed, although if minor amounts are left, they will be volatilized or decomposed into volatile products, in subsequent heating and calcining steps hereinafter described.

The washed and purified alumina may now be suspended in water to form a slurry and a compound is dissolved in the suspending medium which is capable of yielding the desired catalytically active material. After a thorough mixing to insure intimate contacting of the alumina particles and the solution of the dissolved compound, the total mixture is heated to evaporate the water. Temperatures which can be employed in the final drying may range from about 250 to about 500° F. After the volatile content of the residue from the evaporation is reduced to about 10%, the mass may be heated to develop its catalytic properties. An elevated temperature within the range of from about 1000 to about 1500° F. is usually best to develop the desired catalytic properties. The material at this point will be either a powder or a material readily powdered and may be used as such or after forming into pellets or granules by extrusion or pressing methods. The catalytic material thus produced is substantially free from undesirable contaminating substances and shows high catalytic activity.

A feature of the invention is compositing the constituents used to make the catalyst while the hydrated alumina is in the undried state.

When hydrated alumina is precipitated the resulting hydrogel contains water in two forms; (a) as water of hydration, and (b) as water entrapped or enmeshed in the hydrated alumina gel by virtue of its colloidal structure. If the gel is heated the entrapped water is removed first since it is held in the gel more or less mechanically. Thus, a hydrated alumina gel containing but little mechanically held water, can be made by the controlled drying of wet alumina hydrogel. The major portion of the water present in the dried hydrated alumina is in combination as water of hydration. If the dry hydrated gel is further heated aluminas containing progressively less water of hydration may be formed. Thus, for example, if wet precipitated alumina hydro-gel containing alumina trihydrate is carefully dried, substantially pure dry alumina trihydrate may be formed. If it is further heated at a higher temperature, the trihydrate breaks down and forms lower hydrates until eventually all of the water of hydration is removed and substantially anhydrous gamma-alumina is produced. If the heating is continued at too high a temperature alpha-alumina, which is substantially worthless as a catalyst base in the reactions contemplated in this invention, is formed.

If the dry hydrated alumina or the gamma-alumina, prepared as described are impregnated with various compounds of substances which can be decomposed to yield catalytic composites with alumina, catalytic masses having considerable activity can be produced. Indeed, at the present time many commercial catalysts are manufactured in this manner.

We have discovered that catalysts of greatly superior properties are produced when the wet hydrated alumina is composited with compounds of the added substances desired in the final catalyst. The wet hydrated gels used contain of the order of 80-90% water. Catalysts of unusual activity and stability are thus produced. This is not the case if the wet hydrated alumina is first subjected to substantial or complete drying. In our preferred method of compositing the alumina and added compound or compounds, we do not dry the wet alumina hydrogel beyond whatever water removal is effected by filtering or otherwise mechanically separating the hydrogel and water in which it may be suspended, an operation which may be incidental to washing the wet hydrogel.

As previously indicated, the catalyst composite comprises one or more substances in addition to alumina. The choice of the non-aluminiferous substances added will depend to a large extent upon the process in which the catalyst is to be employed. Catalysts produced by our method are not necessarily equivalent in all processes nor are those which are useful in the same process necessarily exactly equivalent to each other. However, for whatever purpose they may be useful the catalysts prepared by our method are superior to those prepared by the conventional forms of manufacture involving the impregnation of alumina.

The compounds of the added substance which may be used in manufacturing catalysts by our method may vary somewhat depending upon their properties and also upon the particular substance which is to be added to the hydrated alumina. In the case of molybdena-containing catalysts and catalysts containing certain other components which are useful for hydroforming gasolines and naphthas, the metal should be in the acid radical. For example, ammonium-molybdate may be used in the manufacture of alumina-molybdena catalysts according to our improved process.

The compounds which are to be added to the wet hydrogel should be soluble in substantial quantities, preferably in water, and should be of a type which is readily decomposable in the final calcining treatment to which the composite is subjected. The compounds should preferably be of such a nature that the decomposition product thereof consists of the oxide of the metal without leaving an undesirable residue as a constituent of the catalyst. The products of decomposition other than the metal oxide should be readily volatilizable under the conditions of subsequent heating. Thus, for example, the composite of the wet alumina hydrogel with ammonium-molybdate solution after evaporation and subsequent heating would yield a composite containing oxides of aluminum and molybdenum, but without any undesirable residue, which is a catalyst poison, from the compound which was the source of the molybdena.

The one possible exception to this might be in cases in which a stabilizing compound is desired as a component of the catalyst; thus certain composites may desirably contain magnesium oxide in relatively minor amounts; usually less than about 5%. The compound added to the wet alumina gel may comprise such materials as, for example, magnesium chromate when the catalyst is to contain chromia, magnesia and alumina. Alkali metal molybdates, chromates, etc., are to be avoided where alkali metal compounds exert a poisonous effect on the final composite, as they do in composites of this kind useful for dehydrogenation, reforming, etc.

Thus, the added compound which is to be the source of the catalytic component may comprise a compound in which the metal is in the acid radical, the remaining part of the compound comprising a component which is either a desirable constituent of the catalyst because of the stabilizing effect, or the catalytic effect which it lends to the composite; or else is volatilizable at the decomposition temperature of said added compound and is thereby removed during the calcination step.

The amount of non-aluminiferous component of the catalyst in relation to the alumina in the final composite may vary over a considerable range, the alumina being the major constituent. In the case of alumina-molybdena composites, catalysts of maximum activity, as shown by the increase in octane number obtained when gasolines or naphthas are hydro-formed, will usually contain from about 6 to about 12 percent of molybdena, although larger or smaller quantities may be added. In the case of other added catalytically active components, the percentage of the compound associated with the alumina may vary over a considerably wider range. For example, effective dehydrogenation and dehydrocyclization catalysts containing chromia, include those in which the amount of chromium sesquioxide in the alumina-chromia composites varies from as low as 2 to as high as 30%.

The catalysts made by the present process have numerous advantages when compared with catalysts of the same chemical composition made by conventional processes, such as by impregnating dried alumina particles with solutions of compounds capable of yielding catalytic oxides or by coprecipitation methods wherein the catalytic compounds are precipitated in the form of hydrated oxides along with the primary precipitate of hydrated alumina. Apparently, the alumina and the added catalytically active compounds are thoroughly dispersed in each other in the catalysts made by our process, which may account for the higher initial activities, higher stability in respect to loss of structure and catalytic properties on accidental overheating or continued use at high temperatures, better life after repeated use and reactivation, and lower carbon deposits for a given conversion and easier regeneration which is exhibited by our catalysts.

The composites prepared by the present procedure are utilizable in various types of processes including those of a batch and of a continuous character and they may be used in the form of a powder or as granules, pellets or extrudates. In one type of continuous operation prepared particles are placed in reaction chambers through which various hydrocarbon reactants may be passed at controlled temperatures, pressures and rates of flow. In powdered form the catalysts may be used in finely divided condition so that the so-called "fluid" type operation may be employed wherein the vapors of hydrocarbon reactants are caused to carry relatively large weight proportions of the powdered catalyst through a reaction zone, after which the catalyst is separated by settling or centrifuging and recycled to further use as long as its catalytic activity is sufficient or wherein the vapors of hydrocarbon reactants pass through a mass of powdered catalytic material and cause its circulation in the reactor without substantial carry-over of the catalyst.

The following data are introduced to illustrate typical operations in the preparation of catalysts which can be prepared by the process of the present invention and typical results obtainable in their use. However, it is not intended to unduly limit the scope of the invention in exact correspondence with the data introduced. In order to indicate the advantage of the present process in producing alumina-molybdena catalysts of high activity, a catalyst was prepared by the present process and its activity of this catalyst was compared with a catalyst of similar alumina-molybdenum oxide weight ratio prepared from finely divided partially dehydrated commercial "activated alumina" consisting of trihydrate and about 10% of uncombined water. The purity of the aluminas were substantially the same, the essential difference between them being that one was undried and the other had been dried to remove most of the water.

In preparing the catalyst in accordance with the present invention, ammonium hydroxide was added to a solution of 1 gram molecular equivalent of aluminum chloride hexahydrate in a liter of water. Concentrated ammonium hydroxide was used and the addition was made over a period of about one hour until the pH was 6.7. At this point the precipitate was filtered in a pressure filter and the wet hydrogel reslurried in about 1 liter of water and the operation of filtering and reslurrying was repeated 12 times. The wash water used was maintained at a pH value close to 7. The gel was not permitted to dry other than by expressing the water held therein; it contained about 85% of water.

The washed wet hydrated alumina was then slurried in a liter of water and a 20% solution of ammonium molybdate was added and thoroughly mixed with the slurry. The water was then evaporated and the residual material was heated at a temperature of about 250° F. to remove most of the water, and then ground to pass a 30 mesh sieve, mixed with 4% rosin, formed into ⅛ inch by ⅛ inch cylindrical pellets in a standard type pelleting machine and heated to a temperature of about 1500° F. for six hours. Its composition was then: alumina 93%, molybdenum oxide 7%.

A catalyst was prepared for comparative purposes, from the commercial "activated alumina," a powdered material was used which contained 35% total water by weight of which about 10% was free or uncombined water. Otherwise the procedure was substantially the same, and the alumina-molybdena ratio was the same as for the catalyst above described.

The two catalysts thus produced were tested as to their activity in hydroforming a Mid-Continent naphtha having the following propties:

| | |
|---|---|
| A. P. I. gravity, 60° F | 52.8 |
| Initial boiling point, °F | 217 |
| End-point, °F | 404 |
| Octane number | 34.5 |
| Molecular weight | 132 |
| Bromine number | 0.5 |

In the runs the naphtha was vaporized, mixed with 3.5 mols of hydrogen per mol of naphtha and passed over a stationary bed of catalyst particles at a temperature of 940° F., under a pressure of 100 pounds per square inch. The liquid hourly space velocity based on the naphtha charged referred to the catalyst space was 1 and the processing period was 6 hours.

*Comparative catalytic activity test data*

| Catalyst Number | 1 | 2 |
|---|---|---|
| Volume percent liquid | 73.8 | 90.7 |
| Weight percent liquid recovery | 77.35 | 92.4 |
| Weight percent carbon | 0.31 | 0.22 |
| Octane number of 400° F. E. P. Fraction | 82.1 | 68 |

In the above tabulation column 1 contains the figures obtained using the catalyst prepared in accordance with the present process, while column 2 contains the corresponding figures obtained using the catalyst in the preparation of which the commercial "activated alumina" was used. The data indicate that the catalyst prepared in accordance with the present process has considerably higher activity as measured by the higher octane number of the liquid product.

The comparative data show the value of the feature of the use of a washed hydrated alumina in the wet form over the use of dried hydrated alumina.

We claim as our invention:

1. A process for dehydrogenating hydrocarbons which comprises subjecting the hydrocarbon under dehydrogenating conditions to the action of a catalyst prepared by forming a suspension of a wet alumina hydrogel in an aqueous solution of a water-soluble compound having a volatile cation and an acid radical containing a metal whose oxide possesses dehydrogenating activity, said suspension being free of any compound reactable with said water-soluble compound to precipitate a compound of said metal, heating said suspension sufficiently to evaporate the bulk of the water therefrom and to form a solid residue comprising alumina and said water-soluble compound, and calcining the solid residue at a temperature sufficient to convert said water-soluble compound to said oxide.

2. The process as defined in claim 1 further characterized in that said water-soluble compound is ammonium molybdate.

3. A hydroforming process which comprises subjecting a gasoline fraction under reforming conditions and in the presence of hydrogen to the action of a catalyst prepared by forming a suspension of a wet alumina hydrogel in an aqueous solution of a water-soluble compound having a volatile cation and an acid radical containing a metal whose oxide possesses dehydrogenating activity, said suspension being free of any compound reactable with said water-soluble compound to precipitate a compound of said metal, heating said suspension sufficiently to evaporate the bulk of the water therefrom and to form a solid residue comprising alumina and said water-soluble compound, and calcining the solid residue at a temperature sufficient to convert said water-soluble compound to said oxide.

4. The process as defined in claim 3 further characterized in that said water-soluble compound is ammonium molybdate.

GLENN M. WEBB.
MARVIN A. SMITH.

REFERENCES CITED

The following references are of record in the file of this patent:

UNITED STATES PATENTS

| Number | Name | Date |
|---|---|---|
| 1,672,308 | Downs | June 5, 1928 |
| 2,002,997 | Herold et al. | May 28, 1935 |
| 2,216,262 | Block et al. | Oct. 1, 1940 |
| 2,231,446 | Grosse | Feb. 11, 1941 |
| 2,249,337 | Visser et al. | July 15, 1941 |
| 2,264,434 | Connolly | Dec. 2, 1941 |
| 2,289,716 | Marschner | July 14, 1942 |
| 2,320,147 | Layng et al. | May 25, 1943 |
| 2,322,622 | Fisher et al. | June 22, 1943 |
| 2,324,066 | Connolly | July 13, 1943 |
| 2,325,033 | Byrns | July 27, 1943 |
| 2,331,338 | Michael et al. | Oct. 12, 1943 |
| 2,356,576 | Free et al. | Aug. 22, 1944 |

FOREIGN PATENTS

| Number | Country | Date |
|---|---|---|
| 380,486 | Great Britain | Sept. 16, 1932 |
| 410,771 | Great Britain | May 22, 1934 |
| 504,614 | Great Britain | Apr. 24, 1939 |